(12) United States Patent
Minoo et al.

(10) Patent No.: US 9,503,733 B2
(45) Date of Patent: Nov. 22, 2016

(54) RE-SAMPLING WITH PHASE OFFSET ADJUSTMENT FOR LUMA AND CHROMA TO SIGNAL ADAPTIVE FILTERS IN SCALABLE VIDEO CODING

(71) Applicant: General Instrument Corporation, Horsham, PA (US)

(72) Inventors: Koohyar Minoo, San Diego, CA (US); David M. Baylon, San Diego, CA (US); Ajay K. Luthra, San Diego, CA (US)

(73) Assignee: ARRIS Enterprises, LLC, Suwanee, GA (US)

( * ) Notice: Subject to any disclaimer, the term of this patent is extended or adjusted under 35 U.S.C. 154(b) by 218 days.

(21) Appl. No.: 14/250,352

(22) Filed: Apr. 10, 2014

(65) Prior Publication Data

US 2014/0307774 A1   Oct. 16, 2014

Related U.S. Application Data

(60) Provisional application No. 61/810,638, filed on Apr. 10, 2013.

(51) Int. Cl.
*H04N 19/80*   (2014.01)
*H04N 19/117*   (2014.01)
*H04N 19/70*   (2014.01)
(Continued)

(52) U.S. Cl.
CPC .......... *H04N 19/117* (2014.11); *H04N 19/134* (2014.11); *H04N 19/186* (2014.11); *H04N 19/187* (2014.11); *H04N 19/33* (2014.11);
(Continued)

(58) Field of Classification Search
CPC ........................... H04N 19/117; H04N 19/86

USPC ......................................................... 375/240
See application file for complete search history.

(56) References Cited

U.S. PATENT DOCUMENTS

2004/0008790 A1   1/2004 Rodriguez
2006/0268991 A1*  11/2006 Segall .................... H04B 1/66
                                                                375/240.24

(Continued)

FOREIGN PATENT DOCUMENTS

| WO | 2013/174254 A1 | 11/2013 |
| WO | 2013/184954 A2 | 12/2013 |
| WO | 2014/025741 A2 | 2/2014 |
| WO | 2014/039547 A1 | 3/2014 |

OTHER PUBLICATIONS

U.S. Appl. No. 14/213,150, entitled "Adaptive Sampling Filter Process for Scalable Video Coding", filed Mar. 14, 2014.

(Continued)

*Primary Examiner* — William C Vaughn, Jr.
*Assistant Examiner* — Jerry Jean Baptiste
(74) *Attorney, Agent, or Firm* — Thomas A. Ward

(57) ABSTRACT

A sampling filter process is provided for scalable video coding. The process provides for re-sampling using video data obtained from an encoder or decoder process of a base layer (BL) in a multi-layer system using adaptive phase shifting to improve quality in Scalable High efficiency Video Coding (SHVC). In order to compensate for phase offsets introduced by downsampling an appropriate phase offset adjustment is made for upsampling in SHVC with an appropriate offset included for proper luma/chroma color space positions. In one approach, an adaptive filter is signaled with its phase offset adjusted to account for the luma/chroma offset.

9 Claims, 7 Drawing Sheets

(51) Int. Cl.
*H04N 19/134* (2014.01)
*H04N 19/186* (2014.01)
*H04N 19/187* (2014.01)
*H04N 19/33* (2014.01)
*H04N 19/86* (2014.01)

(52) U.S. Cl.
CPC .............. *H04N19/70* (2014.11); *H04N 19/80* (2014.11); *H04N 19/86* (2014.11)

(56) References Cited

U.S. PATENT DOCUMENTS

| | | | | |
|---|---|---|---|---|
| 2007/0189390 A1* | 8/2007 | Pappas | .................. | H04N 19/513 375/240.16 |
| 2009/0060040 A1* | 3/2009 | Jeon | ..................... | H04N 19/105 375/240.15 |
| 2010/0226437 A1* | 9/2010 | Robertson | .............. | H04N 19/44 375/240.16 |
| 2015/0110200 A1* | 4/2015 | Nakagami | .............. | H04N 19/44 375/240.25 |
| 2015/0341661 A1* | 11/2015 | Alshina | .................. | H04N 19/30 375/240.12 |

OTHER PUBLICATIONS

U.S. Appl. No. 14/247,560, entitled "Derivation of Resampling Filters for Scalable Video Coding", filed Apr. 8, 2014.
PCT Search Report & Written Opinion, Re: Application #PCT/US2014/033704, dated Jun. 30, 2014.
J. Chen, et al., "Description of scalable video coding technology proposal by Qualcomm (configuration 2)" 11th JCT-VC Meeting; 102. MPEG Meeting; Oct. 2, 2012, 22 pgs.
B. Bross, et al., "High Efficiency Video Coding (HEVC) text specification draft 8", 10th JCT-VC Meeting; 101. MPEG Meeting; Jul. 23, 2012, 286 pgs.
S-W Park, et al., "Intra BL pred. & phase shift", 15th JVT Meeting; 72. MPEG Meeting; Apr. 16, 2005, 16 pgs.
J Dong, et al., "Upsampling based on sampling grid information for aligned inter layer prediction", 13th JCT-VC Meeting; 104; MPEG Meeting; Apr. 8, 2013, 10 pgs.
K. Minoo, et al., "AHG13: SHVC Upsampling with phase offset adjustment", 13th JCT-VC Meeting; 104. MPEG Meeting; Apr. 11, 2013, 8 pgs.
K. Minoo, et al.. "Non SCE1: on handling resampling phase offsets with fixed filters" 14th JCT-VC meeting, Jul. 26, 2013, 6 pgs.

* cited by examiner

|  | Descript or |
|---|---|
| if( nuh_layer_id > 0 && InterLayerTextureRlEnableFlag ) { |  |
|    luma_phase_offset[ 0 ] | se(v) |
|    luma_phase_offset[ 1 ] | se(v) |
|    chroma_phase_offset[ 0 ] | se(v) |
|    chroma_phase_offset[ 1 ] | se(v) |
| } |  |

Table 1. Syntax for signaling of phase offset shift

FIG. 5

| | Descriptor |
|---|---|
| if( nuh_layer_id > 0 && InterLayerTextureRlEnableFlag ) { | |
|    num_phase_offsets_minus1[ 0 ] | ue(v) |
|    num_phase_offsets_minus1[ 1 ] | ue(v) |
|    for( i = 0; i < 2; i++ ) { | |
|      for( j = 0; j <= num_phase_offsets_minus1[ i ]; j++ ) { | |
|         luma_pixel_shift_flag[ i ][ j ] | u(1) |
|         ref_luma_filter_idx[ i ][ j ] | ue(v) |
|         for( k = 0; k <= num_luma_taps_minus1[ i ]; k++ ) { | |
|            delta_luma_filter_coef[ i ][ j ][ k ] | se(v) |
|         } | |
|      } | |
|    } | |
|    for( i = 0; i < 2; i++ ) { | |
|      for( j = 0; j <= num_phase_offsets_minus1[ i ]; j++ ) { | |
|         chroma_pixel_shift_flag[ i ][ j ] | u(1) |
|         ref_chroma_filter_idx[ i ][ j ] | ue(v) |
|         for( k = 0; k <= num_chroma_taps_minus1[ i ]; k++ ) { | |
|            delta_luma_filter_coef[ i ][ j ][ k ] | se(v) |
|         } | |
|      } | |
|    } | |

Table 2. Syntax for signaling of filters with desired phase offset

FIG. 7

(From Fig. 8) — 811

812

With the offsets of Fig. 8 all obtained, determining a sample location xRef and yRef and phase offsets xPhase and yPhase are determined after first determining variables xRefPhase and yRefPhase using following equations:

xRefphase = (xP * PicWRL * (num_phase_offsets_minus1[ 0 ] + 1)) / ScaledW
yRefphase = (yP * PicHRL * (num_phase_offsets_minus1[ 1 ] + 1) ) / ScaledH xRef   = ( xRefphase / (num_phase_offsets_minus1[ 0 ] + 1) )
xPhase = ( xRefphase – xRef * (num_phase_offsets_minus1[ 0 ] + 1) )

yRef   = ( yRefphase / (num_phase_offsets_minus1[ 1 ] + 1) )
yPhase = ( yRefphase – yRef * (num_phase_offsets_minus1[ 1 ] + 1) )

wherein xP and yP are a sample location relative to the top left sample, PicWRL is the picture width reference layer, PicHRL is the picture height reference layer, and Scaled W and Scaled H are the scalable width and height in the EL.

FIG. 9

RE-SAMPLING WITH PHASE OFFSET ADJUSTMENT FOR LUMA AND CHROMA TO SIGNAL ADAPTIVE FILTERS IN SCALABLE VIDEO CODING

CROSS REFERENCE TO RELATED APPLICATION

This application claims priority under 35 U.S.C. §119(e) from earlier filed U.S. Provisional Application Ser. No. 61/810,638 filed on Apr. 10, 2013 and incorporated herein by reference in its entirety.

BACKGROUND

Technical Field

The present invention relates to a sampling filter process for scalable video coding. More specifically, the present invention relates to re-sampling using video data obtained from an encoder or decoder process, where the encoder or decoder process can be MPEG-4 Advanced Video Coding (AVC) or High Efficiency Video Coding (HEVC). Further, the present invention specifically relates to Scalable HEVC (SHVC) that includes a two layer video coding system.

Related Art

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient.

SUMMARY

Embodiments of the present invention provide systems for the upsampling process from BL resolution to EL resolution to implement the upsampling of FIG. 2. The upsampling process of embodiments of the present invention includes three separate modules, a first module to select input samples from the BL video signal, a second module to select a filter for filtering the samples, and a third module using phase filtering to filter the input samples to recreate video that approximates the EL resolution video. The filters of the third module can be selected from a set of fixed filters each with different phase, or one or more adaptive or variable filters with a selectable phase offset.

For embodiments of the present invention luma and chroma phase offset are separately accounted for in the filtering process. In one embodiment, the luma and chroma offset used in the downsampling are determined and used to signal an adaptive filter, the filter having its phase offset adjusted to account for luma/chroma offset.

The luma and chroma offsets can be separately accounted for in either horizontal or vertical dimensions or both using the filters. The filters can include separate row and column filters to enable parallel filter processing of samples along an entire row or column to accommodate a single dimension offset corrections for luma and chroma.

A flag in syntax can be used to signal deblocking and SAO processing. For the case of AVC and HEVC, the BL pixel data used for re-sampling can either be before or after the deblocking process. And for the case of HEVC, the BL pixel data used can either be with or without SAO processing. For AVC and HEVC BL, a first syntax flag can be signaled to indicate whether the upsampling is performed on data that has been previously deblocked. If the first flag is not set, then the upsampling is performed on data prior to deblocking. If the first flag indicates that upsampling is to be performed on data that has been previously deblocked, a second syntax flag is further signaled to indicate whether the upsampling is to be performed on data that has been further processed with SAO. If the second flag is set, then the upsampling is performed on data after SAO; otherwise, it is performed on data prior to SAO but after deblocking.

BRIEF DESCRIPTION OF THE DRAWINGS

Further details of the present invention are explained with the help of the attached drawings in which:

FIG. 5 shows a table including syntax for signaling of luma and chroma phase shift offset that is signaled to select from fixed filters;

FIG. 7 shows a table including syntax for signaling of luma and chroma adaptive filter parameters; and FIGS. 8-9 show a flow chart of simplified method steps for signaling adaptive filters with luma and chroma phase offset in a second embodiment of the present invention.

DETAILED DESCRIPTION

I. Overview of Upsampling Circuitry for Adaptive Phase Correction

Figure 1:
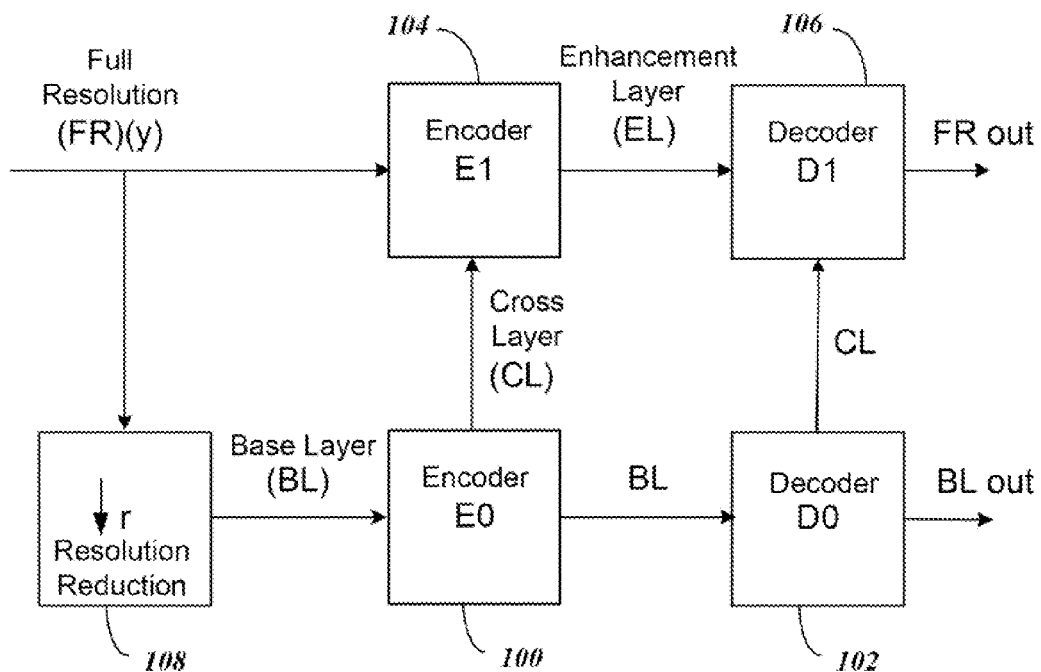
FIG. 1 is a block diagram of components in a scalable video coding system with two layers.
Figure 2:
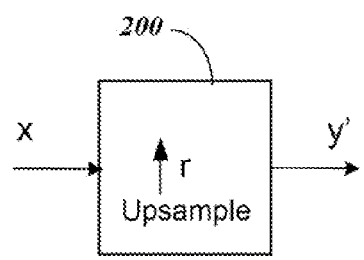
FIG. 2 illustrates an upsampling process that can be used to convert the base layer data to the full resolution layer data for FIG. 1.
Figure 3:
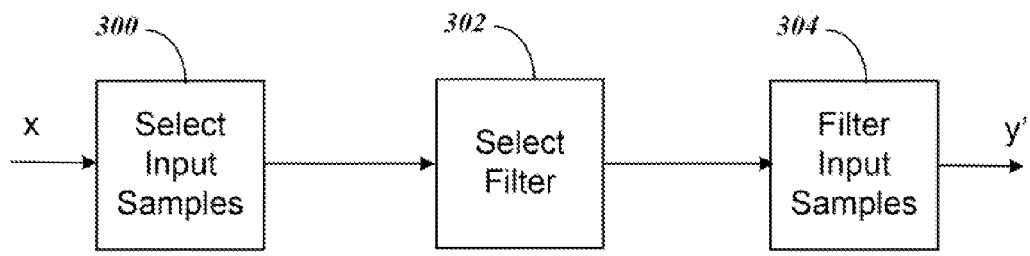
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein as filters h[n; p], where the filters can be separable along each row or column, and p denotes a phase index selection for the filter. The output of the filtering process using the selected filter h[n; p] on the selected input samples produces output value y'.

II. Circuitry with Filter Selection for Adaptive Phase Correction

Figure 4:
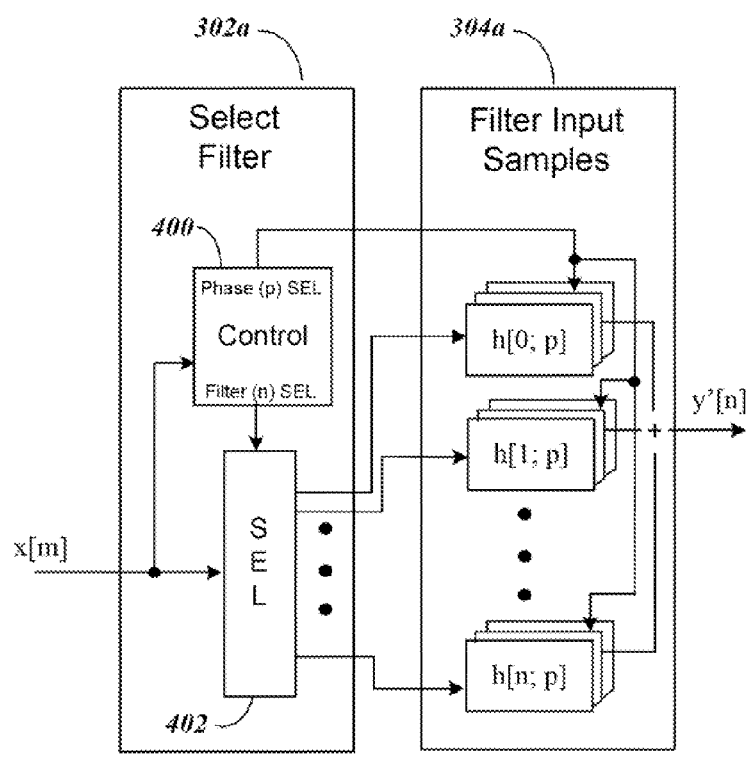
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among P phases from each row or column element depending on the output sample m desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n+1 numbers in h[0,p], . . . , h[n;p]. This is the filter that is applied to the selected input samples to produce an output value y'[n], for example, $y'[0]=h[0,p]*x[0]+h[1,p]*x[1]+ \ldots +h[n,p]*x[n]$, requiring the addition function "+" as illustrated. As an alternative to adding in FIG. 4, the "+" could be replaced with a solid connection and the output y'[n] would be selected from one output of a bank of P filters representing the p phases, with the boxes h[n:p] in module 304a relabeled, for example, as h[n;0], h[n,1], . . . , h[n,p−1] and now each box would have all the filter coefficients needed to form y'[n] without the addition element required.

In addition of how to configure the components of FIG. 4 to select input samples to add or combine coefficients to form y'[n] other modifications to the circuitry of FIG. 4 can be made for additional embodiments of the present invention. Such modifications are described in the following sections A-C.

A. Filters with Adaptive Phase Control

Although the filters h[n:p] in module 304a are shown as separate phase fixed devices, they can be implemented using a single filter with phase p selected and adaptively controlled. The adaptive phase filters can be reconfigured by software. The adaptive filters can thus be designed so that each filter h[n;p] corresponds to a desired phase p.

The filter coefficients h[n;p] can be signaled in the EL from the encoder so that the decoder can reconstruct a prediction to the FR data. Alternatively, a difference between the coefficients and a specified (or predicted) set of coefficients can be transmitted. The coefficient transmission can be made at some unit level (e.g. sequence parameter set (SPS), picture parameter set (PPS), slice, largest coding unit (LCU), coding unit (CU), prediction unit (PU), etc.) and per color component. Furthermore several sets of filters can be signaled per sequence, picture or slice and the selection of which set to be used for re-sampling can be signaled at finer levels, for example at picture, slice, LCU, CU or PU level.

B. Separable Column and Row Filtering

For the re-sampling process, in one embodiment the filters applied can be separable, and the coefficients for each horizontal (row) and vertical (column) dimension can be signaled or selected from a set of filters. This is illustrated by the filters h[n;p] in FIG. 4 that provide separate filters for either an individual row or column. The processing of row or columns separably allows for flexibility in filter characteristics (e.g. phase offset, frequency response, number of taps, etc.) in both dimensions while retaining the computational benefits of separable filtering.

The separable filtering in the re-sampling process can be specified as row filtering first or column filtering first, as the order may affect the memory or computational requirements. In the case of deriving filters based on only the BL and FR data as described previously, note that if row filtering and re-sampling is performed first, the estimation of the filters used for column filtering can be done based on the re-sampled row data (or vice-versa). The filter coefficients can be transmitted in the EL, or a difference between the coefficients and a specified (or predicted) set of coefficients can be transmitted.

C. Hardware and Software Modules for Circuitry

For the upsampling process components for FIG. 4, embodiments of the present invention contemplate that the components can be formed using specific hardware components as well as software modules. For the software modules, the system can be composed of one or more processors with memory storing code that is executable by the processor to form the components identified and to cause the processor to perform the functions described.

III. Accounting for Luma and Chroma Offset

In SHM1.0, the upsampling process from the BL is performed using separable, fixed filters that are identical for each dimension. As a consequence, the phase offsets for the filters used for interpolation are fixed. However, since downsampling is a non-normative process, it is possible that upsampling with assumed, fixed phase offset filters may not properly compensate for a phase offset introduced from downsampling in each dimension. In particular, since luma and chroma components may have different color space resolutions, upsampling for the different color components may require different phase offsets for each dimension. To address this issue, embodiments of the present invention propose two possible solutions for SHVC.

A. Selecting a Filter Based on Normative Offset and Luma/Chroma Offset

The first embodiment provides for a selection of one of multiple filters in FIG. 4 to account for luma and chroma offset. In the current SHM1.0, a set of 16 fixed filters with different phase offsets in the unit interval can be specified. These filters are indexed where larger filter indices are used for larger phase offsets. In order to accommodate a phase offset introduced from downsampling required to maintain proper luma/chroma color space positions after upsampling, it is proposed that an offset parameter be signaled and used in computing the filter index separate from the normative offset. One example of this for the case of 16 filters is shown in Table 1 of FIG. 5, where the signaling (highlighted) occurs at the PPS level. Note that the signaling can occur at other places within the PPS. Alternatively, signaling can be specified at other levels, e.g. VPS, SPS, slice, PU, etc. Further, although offset adjustment is being accounted for in luma/chroma phase positions, similar phase compensation can be made for color spaces, cropping, etc.

In Table 1, when cross-layer (CL) pixel prediction is allowed in an EL (e.g. nuh_layer_id>0 and a flag InterLayerTextureR1EnableFlag is set in SHVC Test Model 1), the four syntax elements listed below are signaled. Note that although specific logic syntax is shown in Table 1 to activate the following four syntax elements, the following four syntax elements, as also shown in Table 1, can be signaled whenever CL prediction is enabled.

luma_phase_offset[0] indicates that the filter index used for upsampling the rows of the luma component should be obtained by adding luma_phase_offset[0] to the offset in the scaled grid, before computing the final index. This is a signed value between −15 to +15 (given a scaled grid size of 16×).

luma_phase_offset[1] indicates that the filter index used for upsampling the columns of the luma component should be obtained by adding luma_phase_offset[1] to the offset in the scaled grid, before computing the final index. This is a signed value between −15 to +15 (given a scaled grid size of 16×).

chroma_phase_offset[0] indicates that the filter index used for upsampling the rows of the chroma component should be obtained by adding chroma_phase_offset[0] to the offset in the scaled grid, before computing the final index. This is a signed value between −15 to +15 (given a scaled grid size of 16×).

chroma_phase_offset[1] indicates that the filter index used for upsampling the columns of the chroma component should be obtained by adding chroma_phase_offset[1] to the offset in the scaled grid, before computing the final index. This is a signed value between −15 to +15 (given a scaled grid size of 16×).

The above syntax is proposed for the Joint Collaborative Team on Video Coding (JCT-VC), SHVC Test Model 1 (SHM 1) Section G.6.2 entitled "Derivation process for reference layer sample location used in resampling," and in particular see J. Chen, J. Boyce, Y. Ye, M. Hannuksela, "Draft of SHVC Test Model Description," JCTVC-L1007, January 2013. The proposed text for SHVC G.6.2 includes information helpful in understanding the syntax, so it is modified as follows:

For the SHVC text in G.6.2, the inputs to this process are:
 a variable cIdx specifying the color component index, and
 a sample location (xP, yP) relative to the top-left sample of the color component of the current picture specified by cIdx.

The output of this process is a sample location (xRef16, yRef16) specifying the reference layer sample location in units of $\frac{1}{16}$-th sample relative to the top-left sample of the reference layer picture.

If cIdx is equal to 0, the variables xRef16 and yRef16 are derived as follows:

$$xRef16=(xP*PicWRL*16+ScaledW/2)/ScaledW+\text{lumaphase\_offset}[0]$$

$$yRef16=(yP*PicHRL*16+ScaledH/2)/ScaledH+\text{luma\_phase\_offset}[1]$$

Otherwise, the variables xRef16 and yRef16 are derived as follows:

$$xRef16=(xP*PicWRL*16+ScaledW/2)/ScaledW+\text{chroma\_phase\_offset}[0]$$

$$yRef16=(yP*PicHRL*16+ScaledH/2)/ScaledH+\text{chroma\_phase\_offset}[1]$$

Note that the syntax for this first embodiment concentrates on activity in FIG. 3 element 300 that selects samples to determine xRef16 and yRef16. The elements xRef16 and yRef16 are determined for downconverted reference pictures that are identified in the select samples element 300. The PicWRL is the picture width reference layer and the PicHRL is the picture height reference layer, also identified in the select samples of element 300. The references to ScaledW for scaled width and ScaledH for scaled height, however, are determined from the FR layer to enable a conversion back from the BL to calculate the EL picture elements with phases set by xRef16 and yRef16. Note that a rounding operation is used in the division operation by ScaledW and ScaledH in the calculation of xRef16 and yRef16. The phase offset determined by the operation for xRef16 and yRef16 first includes a portion divided by ScaledW and ScaledH that will provide a normative phase offset, and the luma and chroma offsets are added to create the final phase values.

Figure 6:
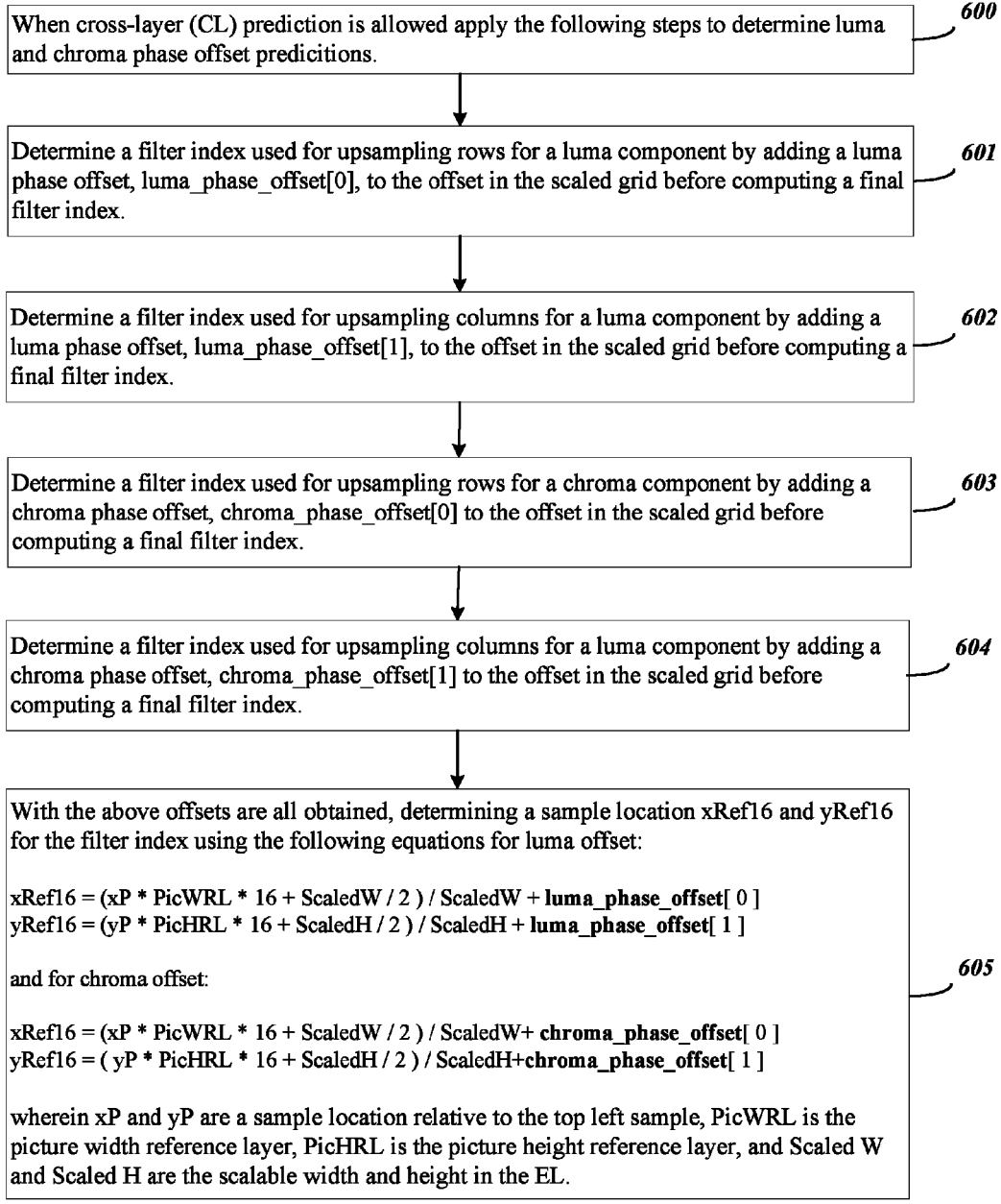
FIG. 6 shows a flow chart of simplified method steps for selecting filters using luma and chroma phase offset in a first embodiment of the present invention.

FIG. 6 shows a simplified flow chart for the above method steps from Table 1 and syntax for determining xRef16 and yRef16 for selecting filters using luma and chroma phase offset in this first embodiment of the present invention. In step 600, the cross layer (CL) prediction is examined to determine if luma and chroma offset steps are to be considered. If so, the steps after 600 are processed. In steps 601 and 602 the luma phase offset is determined for the rows and columns. In steps 603 and 604, the chroma phase offset is determined for the rows and columns. Finally in step 605 the xRef16 and yRef16 values are determined for both luma and chroma from the syntax described above.

The syntax elements allow for different phase offset shifts for luma and chroma as well as for horizontal and vertical directions. However, drawbacks of this first filter selection approach are that only a shift in phase offsets is allowed, all 16 filters (or another fixed number in the system) need to be specified, and the 16 phase offsets are fixed. In addition, rounding operations still need to be performed from desired phase offsets to one the 16 fixed phase offsets. A proposed second embodiment to address these issues is described in the next section.

B. Adapting Filter Based on Luma/Chroma Offset

The second embodiment provides for adjusting the phase offset based upon signaling of adaptive filters. In order to allow for interpolation filters with more general phase offsets and characteristics, instead of re-indexing the filter index of existing fixed filters, this second embodiment signals the filters with the desired phase offsets. The filter coefficients can be differentially signaled using existing HEVC filters, such as the filters used for sub-pixel interpolation in HEVC. Other reference filters can also be used for differential coding of the coefficients.

The Table 2 of FIG. 7 shows syntax for a proposed example for signaling at the PPS level for an embodiment where adaptive filtering offset can be signaled. Note that the signaling can occur at other places within the PPS. As with the fixed filter embodiment of section A, for an alternative signaling can be specified at other levels, e.g. VPS, SPS, slice, PU, etc.

As with the fixed filters of Table 1, in Table 2 of FIG. 7, when cross-layer (CL) pixel prediction is allowed in an EL (e.g. nuh_layer_id>0 and a flag InterLayerTextureR1EnableFlag is set in SHVC Test Model 1), the syntax elements for this embodiment are likewise signaled. Note that although specific logic syntax is shown in Table 2 to activate the following syntax elements, the following syntax elements can be signaled whenever CL prediction is enabled. The syntax elements for adaptive filtering are as follows:

num_phase_offsets_minus1[0] plus one indicates the number of filters with the desired phase offsets for the row upsampling process.

num_phase_offsets_minus1[1] plus one indicates the number of filters with the desired phase offsets for the column upsampling process.

luma_pixel_shift_flag[i][j] indicates per dimension i (i=0, 1) and filter phase index j (j=0, . . . , num_phase_offsets_minus1[i]), whether the filter is to be applied to shifted input luma samples. When this flag is set to 1, the filter is applied to input samples that are shifted by one pixel; otherwise, input samples are not shifted.

ref_luma_filter_indx[i][j] indicates per dimension i (i=0, 1) and filter phase index j (j=0, . . . , num_phase_offsets_minus1[i]), the filter index of one of the four HEVC reference filters used for sub-pixel luma interpolation at 0, ¼, ½ and ¾ phase offsets.

delta_luma_filter_coef[i][j][k] indicates per dimension i (i=0, 1) and filter phase index j (j=0, . . . , num_phase_offsets_minus1[i]) and filter coefficient index k (k=0, . . . , num_luma_taps_minus1[i]), the incremental value which should be added to the corresponding coefficient of the reference filter with index ref_luma_filter_indx[i][j] to obtain the actual filter coefficients for the current filter phase index.

chroma_pixel_shift_flag[i][j] indicates per dimension i (i=0, 1) and filter phase index j (j=0, . . . , num_phase_offsets_minus1[i]), whether the filter is to be applied to shifted input chroma samples. When this flag is set to 1, the filter is applied to input samples that are shifted by one pixel; otherwise, input samples are not shifted.

ref_chroma_filter_indx[i][j] indicates per dimension i (i=0, 1) and filter phase index j (j=0, . . . , num_phase_offsets_minus1[i]), the filter index of one of the eight HEVC reference filters used for sub-pixel chroma interpolation at 0, ⅛, ¼, ⅜, ½, ⅝, ¾ and ⅞ phase offsets.

delta_chroma_filter_coef[i][j][k] indicates per dimension i (i=0, 1) and filter phase index j (j=0, . . . , num_phase_offsets_minus1[i]) and filter coefficient index k (k=0, . . . , num_chroma_taps_minus1[i]), the incremental value which should be added to the corresponding coefficient of the reference filter with index ref_chroma_filter_indx[i][j] to obtain the actual filter coefficients for the current filter phase index.

The values of num_luma_taps_minus1[i] and num_chroma_taps_minus1[i] per dimension i are set to 7 and 3, respectively. In general, these values can also be specified or signaled for each dimension.

To make operation more efficient, in some embodiments the luma_pixel_shift_flag[i][j] and a chroma_pixel_shift_flag[i][j] are implemented. If the flag is set to 1, then the corresponding j_th luma or chroma filter for dimension i is applied to input samples that are shifted by one pixel; otherwise, the input samples are not shifted.

The value of syntax elements ref_luma_filter_indx[i][j] or ref_chroma_filter_indx[i][j] indicates one of four HEVC sub-pixel luma or eight chroma interpolation filters that is used as a basis for prediction for the j_th luma or chroma adaptive phase offset filter along dimension i. The k_th coefficient of the j_th filter along dimension i for luma or chroma is modified by the adding the value of delta_luma_filter_coef[i][j][k] or delta_chroma_filter_coef[i][j][k]. Together, these syntax elements specify the adaptive luma and chroma filters that are used to replace the fixed filters in Tables G-1 and G-2 in SHVC Test Model 1. Note that Tables G-1 and G-2 in SHVC Test Model 1 use 16 filters whereas in the proposed method the number of filters can be specified by num_phase_offsets_minus1[i] in each dimension i.

In one embodiment, a set of default filters for upsampling can be agreed upon for the encoder and decoder. In the case that the default filters are used, a flag can be set and signaled to indicate this. If the flag is not set, then the method described above can be used to signal the filter parameters, and signaling of the filter coefficients can be based on differential coding of the coefficients relative to the default filters.

The semantics corresponding to the above syntax of Table 2 can be changed in the draft Sections G.6.2, G.8.1.4.1.3 and G.8.1.4.1.4 (for Luma and Chroma sample interpolation process) of SHVC Test Model 1 (SHM 1). It should be noted that the proposed derivation process no longer requires rounding operations. The proposed text to help in understanding the syntax, is as follows:

Inputs to this process are
a variable cIdx specifying the color component index,
a sample location (xP, yP) relative to the top-left sample of the color component of the current picture specified by cIdx, Output of this process is a sample location (xRef, yRef) specifying the reference layer sample location relative to the top-left sample of the reference layer picture, and phases (xPhase, yPhase).

1. The variables xRefphase and yRefphase are derived as follows:

$$xRefphase=(xP*PicWRL*(num\_phase\_offsets\_minus1[0]+1))/ScaledW$$

$$yRefphase=(yP*PicHRL*(num\_phase\_offsets\_minus1[1]+1))/ScaledH$$

2. The variables xRef and xPhase are derived by $$xRef=(xRefphase/(num\_phase\_offsets\_minus1[0]+1))$$

$$xPhase=(xRefphase-xRef*(num\_phase\_offsets\_minus1[0]+1))$$

3. The variables yRef and yPhase are derived by $$yRef=(yRefphase/(num\_phase\_offsets\_minus1[1]+1))$$

$$yPhase=(yRefphase-yRef*(num\_phase\_offsets\_minus1[1]+1))$$

Note that for certain values of num_phase_offsets_minus1[0] and num_phase_offsets_minus1[1], the operations for computing xRef, xPhase, yRef, and yPhase may be performed by simpler operations (e.g. shift, &0x0F). Also, if the number of filters is restricted to be $2^g$, the index g (instead of the value $2^g$) can be signaled to indicate $2^g$ filters. Also, in order to account for negative phase offsets, the luma or chroma values of xRef or yRef are decreased by one if the corresponding luma_pixel_shift_flag or chroma_pixel_shift_flag flags are set; otherwise the values of xRef or yRef are not modified.

As with the embodiment of Table 1, for the above syntax a concentration is made on the select samples element 300 of FIG. 3, but also with this embodiment calculations performed using syntax in filter selection element 302 is illustrated. The xRef and yRef are position locations based on downconverted reference pictures that are identified in the select samples element 300. The xRef and yRef values are determined using xRefphase and yRefphase that are calculated in a similar matter to the syntax shown previously relative to Table 1. The xRefphase and yRefphase values in this current embodiment will produce a remainder that will be used to calculate the phase offsets xPhase and yPhase. The xPhase and yPhase values are the phase offset values used to select a filter element in selection module 302 of FIG. 3. Because the filters in this embodiment are adaptive, a rounding operation is not necessarily required after calculations unlike with the previously described embodiment.

Figure 8:
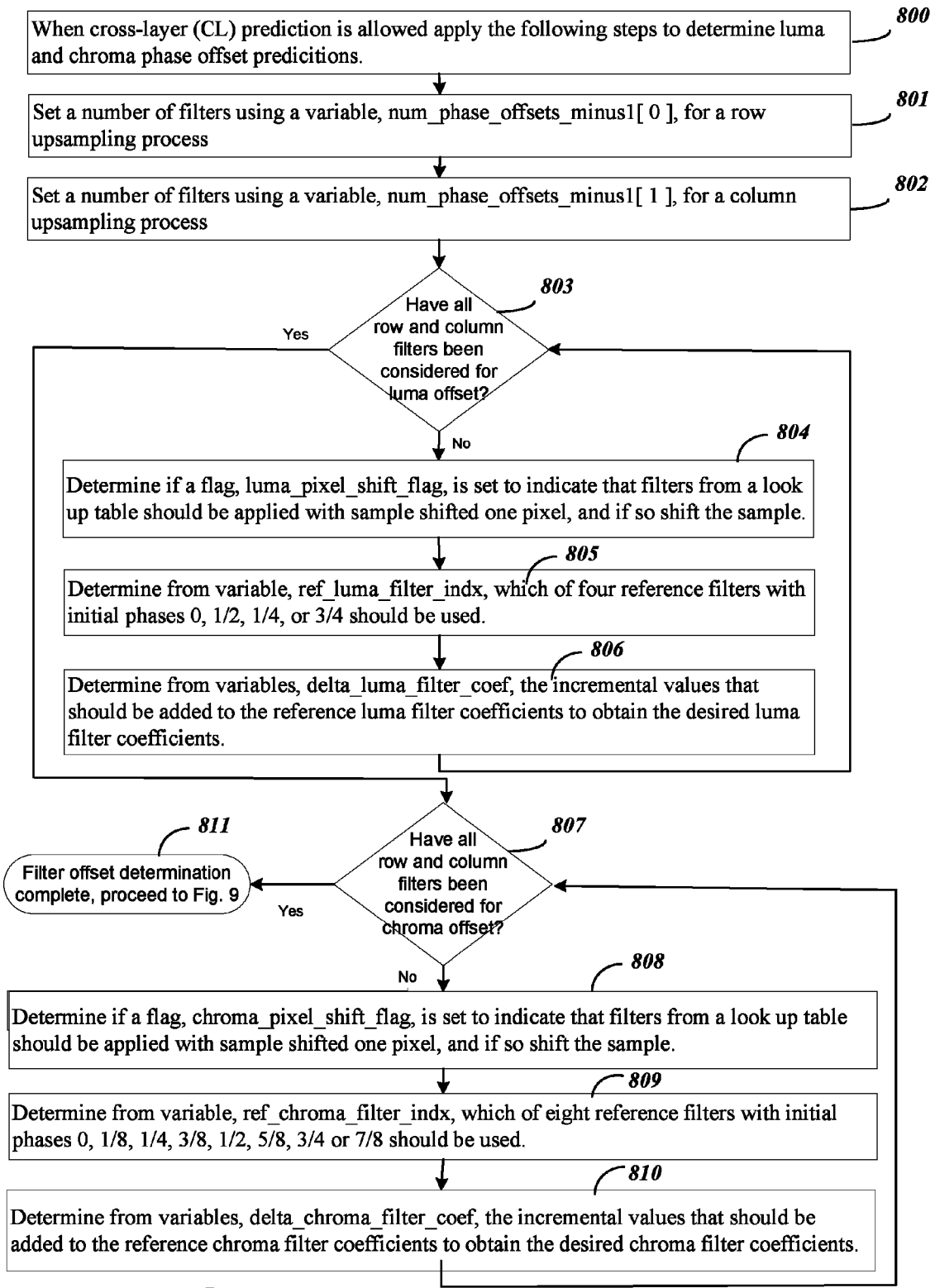

FIGS. 8-9 shows a simplified flow chart for the above method steps from Table 2 and syntax for determining xRef, yRef, xPhase and yPhase for signaling adaptive filters with luma and chroma phase offset in this second embodiment of the present invention. In step 800, the cross layer (CL) prediction is examined to determine if luma and chroma offset steps are to be considered. If so, the steps after 800 are processed. In steps 801 and 802 the number of filters to be evaluated for phase offset adjustment is determined along rows and columns. Next in a loop through steps 803-806 to consider the luma offset for each filter, a flag indicating if a pixel shift should be made is evaluated in step 804, a reference luma filter is determined in step 805, and the delta_luma_filter_coef values are used to modify the reference luma filter in step 806. Further in steps 807-810, a similar loop is performed to determine the chroma filters. Finally in steps 811-812 the xRef, yRef, xPhase and yPhase values are determined.

Benefits of this second embodiment include the following: (1) Arbitrary phase offsets are allowed in each dimension. (2) Better matching of filters and phases to scalability ratios other than 2×, 1.5×. (3) Less computation needed since rounding operations to map a desired phase to one of the current fixed phases are eliminated. (4) Only the filters and phases necessary for performing the upsampling need to be signaled and indexed; there is no need to design and implement 16 luma and 16 chroma filters.

C. Deblocking and SAO Processing

Either of the embodiments illustrated with Table 1 or Table 2 can be implemented whether deblocking or SAO processing is used. In the upsampling process, pixel data from the encode/decode process from the BL is used to generate a prediction for the FR pixel data. The BL pixel data can be extracted, for example, at various points in the decoding process. For the case of AVC and HEVC, the BL pixel data used for re-sampling can either be before or after the deblocking process. And for the case of HEVC, the BL pixel data used can either be with or without SAO processing. In one embodiment for an AVC and HEVC BL, a first syntax flag can be signaled to indicate whether the upsampling is performed on data that has been previously deblocked. If the first flag is not set, then the upsampling is performed on data prior to deblocking. In addition, for the case of an HEVC BL, if the first flag indicates that upsampling is to be performed on data that has been previously deblocked, a second syntax flag is further signaled to indicate whether the upsampling is to be performed on data that has been further processed with SAO. If the second flag is set, then the upsampling is performed on data after SAO; otherwise, it is performed on data prior to SAO but after deblocking. The signaling of the flags can be made at some unit level (e.g. SPS, PPS, slice, LCU, CU, PU, etc.) and per color component, or it can be derived or predicted from other previously decoded data.

Although the present invention has been described above with particularity, this was merely to teach one of ordinary skill in the art how to make and use the invention. Many additional modifications will fall within the scope of the invention as that scope is defined by the following claims.

What is claimed:

1. A system for scalable video coding comprising:
a first coding layer for coding video with a base resolution;
a second coding layer for coding video with an enhanced resolution having a higher resolution than the base resolution;
an upsampling unit receiving sampling signals from the first coding layer and providing an output signal to the second coding layer after an upsampling process, le;.5qwherein the upsampling unit output signal enables more efficient coding in the second coding layer, wherein the upsampling unit comprises:
- a first module formed by software executable in a processor for selecting input samples of the video signal in the first coding layer;
- a second module formed by code executable in the processor providing selection of one adaptive filter of a plurality of adaptive filters for processing the selected input samples; and
- a third module including the plurality of adaptive filters, the third module formed by code executable in the processor and providing the output signal from the upsampling unit, wherein the first coding layer is downsampled from the second coding layer, and wherein at least one of a luma phase offset and a chroma phase offset in downsampling is used in determining the adaptive filter,
- wherein both the luma phase offset and the chroma phase offset in downsampling is determined and used in determining the adaptive filter,
- wherein the luma phase offset and the chroma phase offset are specified for both row and column filtering,
- wherein for each filter in the plurality of filters a determination is made of the number of filters in a row from num_phase_offsets_minus1[0] and in a column from num_phase_offsets_minus1[1],
- wherein a row and column luma filter is specified differentially using a reference luma filter specified by ref_luma_filter_indx, and using filter coefficient delta values specified by delta_luma_filter_coef, and
- wherein a row and column luma filter is specified differentially using a reference chroma filter specified by ref_chroma_filter_indx, and using filter coefficient delta values specified by delta_chroma_filter_coef.

2. The system of claim 1, wherein a sample location xRef and yRef for the first module with a phase xPhase and yPhase for use in the second module is determined using variables xRefPhase and yRefPhase in the following equations:

$$x\text{Refphase}=(xP*\text{Pic}WRL*(\text{num\_phase\_offsets\_minus1}[0]+1))/\text{ScaledW}$$

$$y\text{Refphase}=(yP*\text{Pic}HRL*(\text{num\_phase\_offsets\_minus1}[1]+1))/\text{ScaledH}$$

$$x\text{Ref}=(x\text{Refphase}/(\text{num\_phase\_offsets\_minus1}[0]+1))$$

$$x\text{Phase}=(x\text{Refphase}-x\text{Ref}*(\text{num\_phase\_offsets\_minus1}[0]+1))$$

$$y\text{Ref}=(y\text{Refphase}/(\text{num\_phase\_offsets\_minus1}[1]+1))$$

$$y\text{Phase}=(y\text{Refphase}-y\text{Ref}*(\text{num\_phase\_offsets\_minus1}[1]+1))$$

wherein xP and yP are a sample location relative to the top left sample, PicWRL is the picture width reference layer, PicHRL is the picture height reference layer, and ScaledW and ScaledH are the scalable width and height in the second coding layer.

3. The system of claim 1, wherein it is signaled from an encoder to a decoder using a flag in the second coding layer whether the first coding layer data is deblocked data.

4. The system of claim 1, wherein when data has been deblocked it is signaled from an encoder to a decoder using a flag in the second coding layer whether the first coding layer data has been processed with SAO.

5. The system of claim 1, wherein the selection of a filter from the plurality of filters in the third module is controlled by selection from the second module based on the first phase offset determination.

6. A method for scalable video coding comprising: receiving sampling signals from the first coding layer and providing an output signal for an upsampling process to a second coding layer that codes video with an enhanced resolution having a higher resolution than the base resolution;
- selecting input samples of the video signal in the first coding layer for coding video with a base resolution;
- selecting from a plurality of filters for processing the selected input samples; and
- filtering the selected input samples with the selected filter, wherein an adaptive phase offset is generated for the selected filter to be used in an upsampling process to provide the output signal for the upsampling process, and wherein at least one of luma phase offset and chroma phase offset is determined and included in the adaptive phase offset of the selected filter,
- wherein both the luma phase offset the chroma phase offset in downsampling is determined and used in providing the adaptive phase offset of the selected filter,
- wherein the luma phase offset and the chroma phase offset are specified for both row and column filtering,
- wherein for each filter in the plurality of filters a determination is made of the number of filters in a row from num_phase_offsets_minus1[0] and in a column from num_phase_offsets_minus1[1],
- wherein a row and column luma filter is specified differentially using a reference luma filter specified by ref_luma_filter_indx, and using filter coefficient delta values specified by delta_luma_filter_coef, and
- wherein a row and column luma filter is specified differentially using a reference chroma filter specified by ref_chroma_filter_indx, and using filter coefficient delta values specified by delta_chroma_filter_coef.

7. The method of claim 6, wherein a sample location xRef and yRef for the first module with a phase xPhase and yPhase for use in the second module is determined using variables xRefPhase and yRefPhase in the following equations:

$$x\text{Refphase}=(xP*\text{Pic}WRL*(\text{num\_phase\_offsets\_minus1}[0]+1))/\text{ScaledW}$$

$$y\text{Refphase}=(yP*\text{Pic}HRL*(\text{num\_phase\_offsets\_minus1}[1]+1))/\text{ScaledH}$$

$$x\text{Ref}=(x\text{Refphase}/(\text{num\_phase\_offsets\_minus1}[0]+1))$$

$$x\text{Phase}=(x\text{Refphase}-x\text{Ref}*(\text{num\_phase\_offsets\_minus1}[0]+1))$$

$$y\text{Ref}=(y\text{Refphase}/(\text{num\_phase\_offsets\_minus1}[1]+1))$$

$$y\text{Phase}=(y\text{Refphase}-y\text{Ref}*(\text{num\_phase\_offsets\_minus1}[1]+1))$$

wherein xP and yP are a sample location relative to the top left sample, PicWRL is the picture width reference layer, PicHRL is the picture height reference layer, and ScaledW and ScaledH are the scalable width and height in the second coding layer.

8. The method of claim 6, wherein it is signaled from an encoder to a decoder using a flag in the second coding layer whether the first coding layer data is deblocked data.

9. The method of claim 6, wherein when data has been deblocked it is signaled from an encoder to a decoder using a flag in the second coding layer whether the first coding layer data has been processed with SAO.

* * * * *